(12) United States Patent  (10) Patent No.: US 7,237,912 B2
Semineth  (45) Date of Patent: Jul. 3, 2007

(54) METHOD FOR ACTUATING A DIMMABLE MIRROR

(75) Inventor: Marco Semineth, Bad Königshofen (DE)

(73) Assignee: Brose Fahrzeugteile GmbH & Co. KG Coburg, Coburg (DE)

( * ) Notice: Subject to any disclaimer, the term of this patent is extended or adjusted under 35 U.S.C. 154(b) by 306 days.

(21) Appl. No.: 10/913,712

(22) Filed: Aug. 6, 2004

(65) Prior Publication Data

US 2005/0052763 A1   Mar. 10, 2005

(30) Foreign Application Priority Data

Aug. 8, 2003 (DE) ................. 103 37 477
Aug. 8, 2003 (DE) ................. 103 37 478

(51) Int. Cl.
*G02B 17/00*  (2006.01)
*G02B 5/08*  (2006.01)
*G02F 1/15*  (2006.01)

(52) U.S. Cl. ............ 359/604; 359/603; 359/265

(58) Field of Classification Search ........ 359/601–614, 359/265–274
See application file for complete search history.

(56) References Cited

U.S. PATENT DOCUMENTS 4,741,603 A   5/1988  Miyagi et al. ............ 359/220
4,793,690 A * 12/1988 Gahan et al. ............ 359/604
4,886,960 A * 12/1989 Molyneux et al. .......... 250/206
5,973,819 A * 10/1999 Pletcher et al. ............ 359/265
6,089,721 A *  7/2000 Schierbeek ................ 359/603
6,614,577 B1 *  9/2003 Yu et al. .................... 359/265
2003/0053216 A1 *  3/2003 Hoekstra et al. ............ 359/603

FOREIGN PATENT DOCUMENTS

DE   36 15 379 C2   11/1986

* cited by examiner

*Primary Examiner*—Thong Q Nguyen
(74) *Attorney, Agent, or Firm*—Christie, Parker & Hale, LLP

(57) ABSTRACT

A method for actuating an electrically dimmable mirror in which a predefined degree of dimming of the mirror is set by charging or discharging the mirror to a predefined setpoint voltage. The method provides for actuating an electrically dimmable mirror in which particularly fast switching over the degree of dimming of the mirror is achieved. In the method, in order to switch over the degree of dimming, a charge voltage is applied to the mirror which exceeds in absolute terms the setpoint voltage which is necessary for the desired degree of dimming, and the setpoint voltage is applied to the mirror after the desired degree of dimming has been attained.

17 Claims, 4 Drawing Sheets

METHOD FOR ACTUATING A DIMMABLE MIRROR

CROSS-REFERENCE TO RELATED APPLICATION(S)

This application claims priority of German Patent Application Number 103 37 477.9, filed on Aug. 8, 2003, and German Patent Application Number 103 37 478.7, filed Aug. 8, 2003.

BACKGROUND

The invention relates to a control device and a method for controlling a degree of dimming of a motor vehicle mirror.

Electrochromatic external mirrors are known in the field of motor vehicle engineering. These external mirrors can be dimmed by applying an external voltage to the mirror.

BRIEF DESCRIPTION

The invention is based on the object of specifying a control device of a mirror and a method for actuating an electrically dimmable mirror in which the view of the driver of the vehicle through the mirror is improved as far as possible.

There is a provision, according to the invention, that, in order to switch over the degree of dimming, a charge voltage is applied to the mirror which exceeds in absolute terms the setpoint voltage which is necessary for the desired degree of dimming, specifically in particular until the desired degree of dimming is attained, and that, after the desired degree of dimming is attained, the setpoint voltage is applied to the mirror. The desired degree of dimming is understood here in particular to be a range in which the driver of the vehicle can observe the field of vision by looking into the mirror without disruptive dazzling by other light sources.

The charge voltage is understood here to be a voltage which is made available and which can be correspondingly applied. The charge voltage can be made available here in particular by a correspondingly charged capacitor, by an induced voltage which is generated by a flow of current through an inductor, or by a battery voltage potential. Here, such voltage sources can be reduced by a control element, for example a transistor for the charge voltage at the level of the applied voltage. In contrast to one advantageous refinement of the invention in which the charge voltage is constant, it is possible to provide, in an alternative refinement, that the charge voltage fluctuates in a voltage range or drops within this voltage range, the voltage range exceeding in absolute terms the necessary setpoint voltage. In one development of the invention, the mirror is advantageously "recharged" by applying the respective maximum permitted charge voltage for the mirror while the degree of dimming is being switched over. The maximum charge voltage is dependent here on the electrical properties of the mirror and can also vary over the current charge state.

While the mirror is being charged, the maximum permitted charge voltage is the maximum permitted mirror voltage (maximum voltage at the mirror); the maximum voltage in an electrochromatic mirror is preferably 1.4 volts or less.

While the mirror is being discharged, the maximum permitted charge voltage is that voltage which corresponds in absolute terms to the difference in voltage between the permitted maximum voltage of the mirror and the actual voltage of the mirror (=voltage at the internal capacitor of the mirror) and has a voltage direction or voltage polarity which is opposite to that of the actual voltage. For this reason it is considered advantageous if the polarity of the charge voltage is reversed during discharging and a voltage with the aforesaid voltage absolute value is applied to the mirror. A full bridge circuit is preferably used to reverse the polarity of the charge voltage.

The charge voltage with reversed polarity is preferably simultaneously adapted in accordance with the actual voltage at the mirror during the entire discharging process in order to ensure that a charge voltage with which discharging is carried out at an optimum speed is always present at the mirror.

A further aspect of the invention is that the charge state of the mirror is monitored—at least during the charging or discharging of the mirror—in that the mirror is electrically disconnected from the charge voltage and the actual voltage which is present at the mirror is measured with high impedance. For example a MOSFET transistor input, which can be integrated, for example, into a differential stage, is used as the measuring input.

A dimmable mirror behaves electrically approximately like a series circuit composed of a capacitor which is subject to loss and a resistor. If the particular actual voltage at the capacitor is measured during the charging or discharging process, said voltage differs from the charge voltage of the capacitor. This measurement error is due to the voltage drop which is caused by the internal resistance of the mirror. During the charging and discharging of the mirror capacitor, a charge current or discharge current flows through the internal capacitor and the internal resistor so that the aforementioned significant voltage drop occurs at the, in particular, nonlinear, resistor. For example, when the mirror is charged with an actual voltage of zero volts, the entire charge voltage at the series resistor initially drops. At this point, the invention comes into play by switching the mirror to high impedance during the measuring of the charge state of the internal capacitor so that no significant discharge voltage occurs and the internal resistance of the mirror in comparison with the high-impedance input resistance of the measuring circuit of the control device can be ignored.

In order to ensure that the charging or discharging process is terminated, as soon as the target voltage at the mirror or the target charge state is reached, the electrical charge state of the mirror is preferably monitored cyclically or continuously. As soon as the actual voltage of the mirror corresponds to the setpoint voltage or lies within a tolerance band which is predefined for the setpoint voltage, the device is switched over from the maximum voltage to the setpoint voltage.

In addition, or alternatively, the charge state of the mirror can be monitored by sensing and evaluating the charge current or discharge current flowing through the mirror during the charging or discharging. The charge current or discharge current which flows through the mirror is preferably integrated and the resulting integration result is used to determine the charge state of the mirror.

In order to be able to determine the optimum degree of dimming of the mirror, it is considered advantageous if the light which is incident on the mirror is measured and the degree of dimming is predefined as a function of the incident light power. Moreover, it is also preferably possible to measure the intensity of the ambient light and to set the degree of dimming as a function of the difference between the light intensity which is incident on the mirror and the intensity of the ambient light. For example two sensors are used to measure the two light intensities (2 sensor principle).

A further aspect of the invention is that, in order to set the degree of dimming, the control device is configured to apply a charge current to the mirror (4) so that a voltage which is present at the mirror exceeds in absolute terms the setpoint voltage (Usoll) which is necessary for the desired degree of dimming. For this purpose, in order to predefine the time profile of the charge curve, said curve is dependent on values of the equivalent circuit diagram of the characteristic electrical properties of the EC mirror. The charge current can be controlled here by corresponding hardware circuitry, particularly preferably by a program-controlled control means. For this purpose, in one configuration of the invention, the charge current is measured by means of a first differentiating element at a measuring resistor, and the output voltage value of the first differentiating element is subtracted, by means of a second differentiating element, from a predefined voltage value—correlating with the desired charge current—of a microcontroller, the output signal of the second differentiating element driving the charge current by means of a transistor.

The invention also relates to a control device for actuating an electrically dimmable mirror, the control device setting a predefined degree of dimming of the mirror by charging or discharging the mirror to a predefined setpoint voltage. According to one configuration of the invention, the control device has a full bridge circuit with which the polarity of the charge voltage at the mirror can easily be reversed, in particular in order to discharge the mirror. This control device preferably has a microcontroller which is designed to charge or discharge the capacitor of the mirror to a setpoint voltage in accordance with the method presented above.

BRIEF DESCRIPTION OF THE DRAWINGS

The invention is further explained with reference to the FIGS.

DETAILED DESCRIPTION

Electrochromatic exterior mirrors behave electrically approximately as a series circuit of a capacitor which is subject to loss and a resistor. By applying an external voltage—referred to below as a charge voltage—to the mirror, the capacitor of the mirror can be charged or discharged; the charge state of the capacitor—that is to say the particular "actual voltage" at the mirror—determines the degree of dimming of the mirror. For example, the more the mirror is dimmed, the greater the electrical charge which is stored in the capacitor of the mirror. By "recharging" the capacitor of the mirror it is thus possible to change the degree of dimming of the mirror. One possibility is to charge the mirrors to a setpoint voltage of 0.7 volts for the sake of dimming. If the dimming is to be ended, the mirror is discharged, specifically to a voltage of zero volts.

Figure 1:
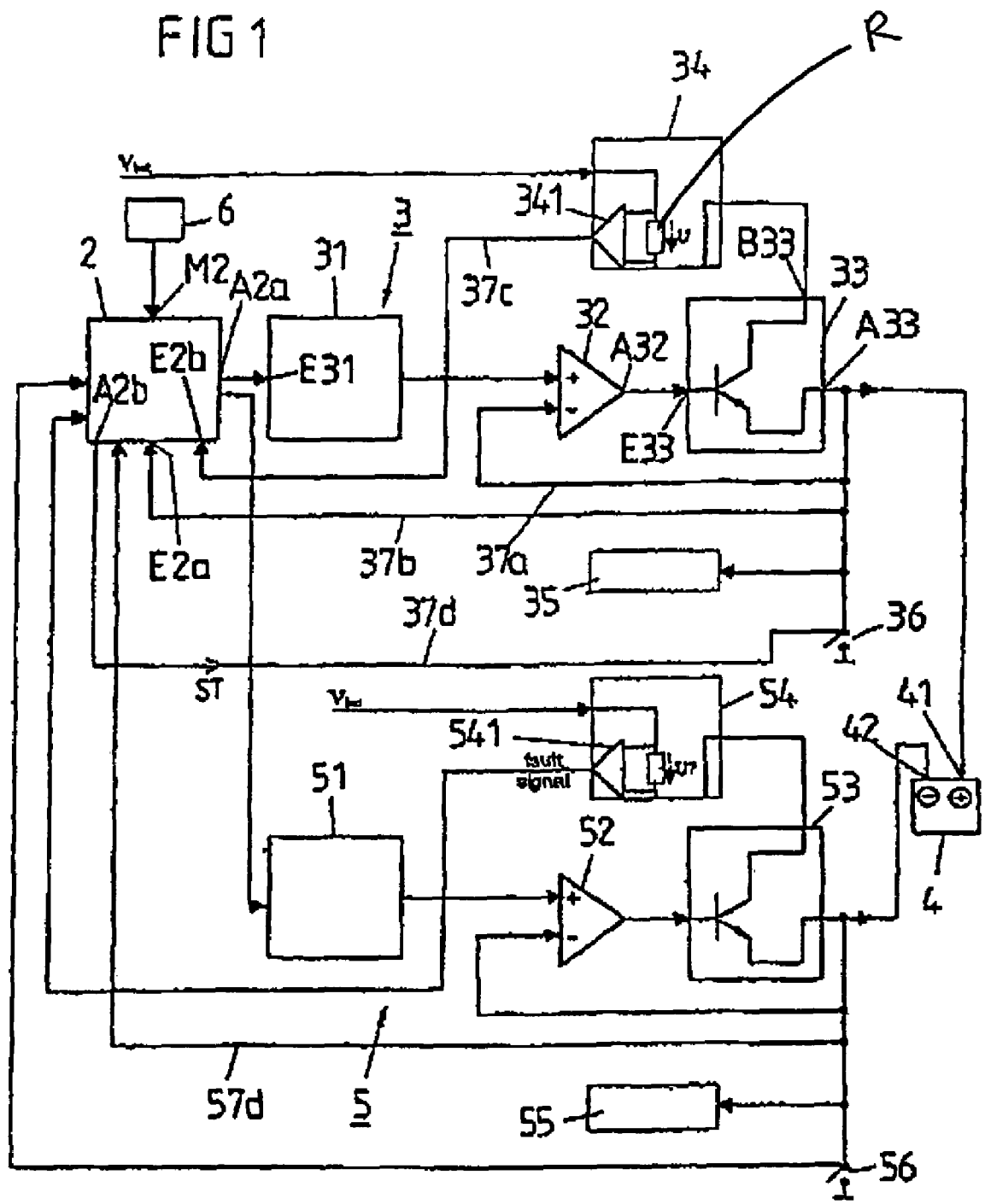
FIG. 1 shows an exemplary embodiment of a control device according to the invention with which the method according to the invention can also be carried out.

FIG. 1 shows a control device with a microprocessor 2 which is connected via an upper control branch 3 in FIG. 1 to a "positive terminal" of an electrochromatic, that is to say electrically dimmable, motor vehicle mirror 4. The microprocessor 2 is connected to a "negative terminal" of the motor vehicle mirror 4 via a lower control branch 5 in FIG. 1.

The upper control branch 3 and the lower control branch 5 form a bridge circuit with which the polarity at the two terminals of the mirror 4 can be switched over.

The upper control branch 3 has a D/A converter 31, an operational amplifier 32, a linear amplifier 33, a device 34 for protecting against short circuits to ground, a Vbat short circuit protection device 35 and a controllable switch 36. The linear amplifier 33 and the operational amplifier 32 together form a linear controller.

An input E31 of the D/A converter 31 is connected to a first control output A2a of the microprocessor 2. At the output end, the D/A converter 31 is connected to a "positive input" of the operational amplifier 32. An input E33 of the linear amplifier 33, whose output A33 is connected to the positive terminal 41 of the motor vehicle mirror 4, is connected downstream of an output A32 of the operational amplifier 32. The linear amplifier 33 also has a current supply input B33 via which the linear amplifier 33 is connected to the device 34 for protecting against a short circuit to ground, and via said device to a battery voltage Vbat.

The positive terminal 41 of the motor vehicle mirror 4 is "fed back" via a control loop line 37a to the negative input of the operational amplifier 32, and via a second control loop line 37b to a control input E2a of the microprocessor 2.

As is shown in FIG. 1, the linear amplifier 33 can be formed, for example, by an npn-type transistor whose base terminal forms the input E33 of the linear amplifier 33, and whose collector terminal forms the battery terminal B33 of the linear amplifier 33. The emitter terminal of the npn-transistor forms the output A33 of the linear amplifier 33.

The device 34 for protecting against short-circuits to ground has a shunt resistor R to which a second operational amplifier 341 is assigned. The output of the second operational amplifier 341 is connected via a first control line 37c to a second control input E2b of the microprocessor 2.

Alternatively, the first control line 37c can also be connected to the control input E2a of the microprocessor 2.

A control terminal of the switch 36 is connected via a second control line 37d to a second control output A2b of the microprocessor 2.

The lower control branch 5 is identical in design to the upper control branch 3; it has a D/A converter 51, an operational amplifier 52, a linear amplifier 53, a device 54 for protecting against short-circuits to ground, a Vbat short-circuit protection device 55 and a controllable switch 56. Moreover, with respect to the design of the lower control branch 5 and with respect to the connection of the lower control branch 5 to the microprocessor 2 reference is made to the above statements relating to the upper control branch 3.

Below, it is assumed, by way of example, that the motor vehicle mirror 4 is not dimmed at a voltage (actual voltage) of zero volts, and the light which is incident on the mirror is therefore reflected almost completely. In the case of an actual voltage of 0.7 volts, the mirror is to be in its dimmed state in which the mirror is partially dimmed and reflects only part of the incident light. The maximum permitted operating voltage (maximum voltage) of the motor vehicle mirror 4 is to be 1.4 volts, for example.

The control device according to FIG. 1 is operated as follows:

1. Charging of the Motor Vehicle Mirror 4:

Given an actual voltage of 0 volts, the motor vehicle mirror 4 is in its normal state, that is to say its nondimmed state. If very intensive light is then incident on the motor vehicle mirror with poor ambient light having been detected, this is detected with a photodetector 6 which is connected to a measuring input M2 of the microprocessor 2, and a corresponding measurement signal is transmitted to the microprocessor 2. The microprocessor 2 will then dim the motor vehicle mirror 4 by charging the mirror to a dimming voltage of 0.7 volts. The light intensity of the surroundings can be measured by the microprocessor using, for example, a further photodetector (not illustrated in FIG. 1).

In order to obtain the shortest possible charging time, the microprocessor 2 actuates the D/A converter 31 in such a way that the maximum permitted voltage U1=Umax=1.4 volts at the mirror is present at the output of the D/A converter 31, and thus at the output of the linear amplifier 33 and at the positive terminal of the motor vehicle mirror 4.

The negative terminal 42 of the motor vehicle mirror 4 is connected to ground by closing the ground switch 56.

Figure 2:
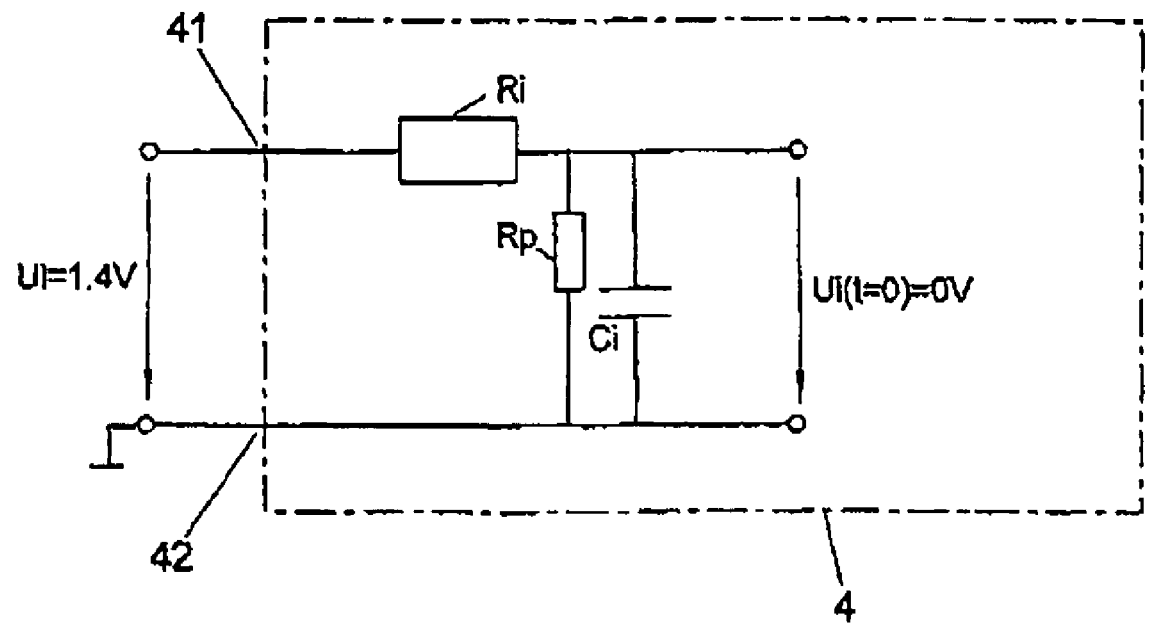
FIG. 2 is an electrical equivalent circuit diagram of a dimmable motor vehicle mirror during charging.

The potential difference, and thus the charge voltage U1 at the terminals of the motor vehicle mirror 4, is thus U1=1.4 volts (cf. FIG. 2).

The internal capacitor Ci of the motor vehicle mirror 4 which is subject to loss by means of a parallel resistor Rp is then charged using the charge voltage of U1=1.4 volts. However, since the target voltage is only 0.7 volts, the charge state of the motor vehicle mirror 4 must be checked during the charging in order to avoid a situation in which the actual voltage Ui(t) of the mirror exceeds the desired 0.7 volts.

A significant advantage of this exemplary embodiment is that a high switch-over speed when switching over or recharging the mirror is achieved very easily. In the process, a voltage which is higher in absolute terms than would correspond to the charge state of the mirror which is actually desired or to be achieved, and thus to the "target voltage" which is to be set at the mirror is selected for charging or discharging the mirror—that is to say for recharging the internal capacitor of the mirror. As a result of the fact that the charge voltage is higher than the target voltage, the recharging time is no longer predefined solely by the electrical time constant of the mirror but rather also by the ratio between the change in voltage to be achieved at the mirror and the applied charge voltage. If the charge voltage is, for example, twice as high during the recharging than the change in voltage which is to be achieved at the mirror, the "recharging time" and thus the switchover time of the mirror is, in a first approximation, only half as long as in a charging method in which the charge voltage corresponds to the "target voltage".

In order to measure the actual voltage Ui(t), the charging process is interrupted and the motor vehicle mirror 4 is switched to high impedance. The "switching to high impedance" is achieved in that the two switches 36 and 56 are opened and the transistors of the two linear amplifiers 33 and 53 are "switched off" by applying correspondingly low base-emitter voltages (<approximately 0.7 volts).

After the "switching to high impedance", a charge current no longer flows through the motor vehicle mirror 4 so that a drop in voltage cannot occur at the internal ohmic resistor Ri of the motor vehicle mirror 4. After the "switching to high impedance", the actual voltage Ui at the internal capacitor Ci of the motor vehicle mirror 4 is thus measured very precisely. The measurement of the actual voltage Ui is carried out by means of the control lines 37d and 57d via which the potentials at the terminals of the motor vehicle mirror 4 are applied to the microprocessor 2. A significant advantage of the method of this exemplary embodiment is that measuring errors are avoided when measuring the charge state of the mirror.

If the microprocessor 2 detects that the actual voltage Ui has not yet reached the desired dimming voltage of 0.7 volts, the charge process is continued with the charge voltage of 1.4 volts, that is to say the maximum voltage.

If, on the other hand, the microprocessor 2 detects that the actual voltage Ui has reached the desired dimming voltage or setpoint voltage of 0.7 volts and lies in a tolerance band which is predefined for the dimming voltage, the charge process is ended and the charge voltage is reduced to the setpoint voltage Usoll=0.7 volts. The microprocessor then switches into a control process in which the voltage of Usoll=0.7 volts is kept constant at the connecting terminals of the motor vehicle mirror 4. In order to measure the actual voltage Ui at the motor vehicle mirror 4, the latter is no longer switched to high impedance during the "control phase" since, as it were, there is no longer any charge current flowing and measuring errors due to a voltage drop occurring at the internal resistor Ri of the mirror 4 are negligible. The voltage at the motor vehicle mirror 4 is controlled in hardware terms in this phase by the operational amplifier 32.

The control voltage of 0.7 volts for maintaining the dimmed state can be referred to as a "reference signal" for the dimmed state.

2. Discharging of the Motor Vehicle Mirror 4:

Given an actual voltage Ui at the motor vehicle mirror 4 of 0.7 volts, the motor vehicle mirror is in its dimmed state. If no intensive light is incident any more on the motor vehicle mirror compared with the light intensity of the ambient light, this is detected with the photodetectors and a corresponding measurement signal is transmitted to the microprocessor 2. The microprocessor 2 will then adjust the motor vehicle mirror 4 to the normal state by discharging the mirror to a setpoint voltage Usoll=0 volts.

In order to achieve the shortest possible discharge time, the microprocessor 2 actuates the switch 36 in such a way that the positive terminal 41 of the mirror 4 is connected to ground.

The negative terminal 42 of the motor vehicle mirror 4 is connected via the D/A converter 51, the operational amplifier 52 and the linear amplifier 53 to a positive potential which corresponds in absolute terms to the differential voltage between the admissible maximum voltage of the mirror (1.4 volts) and the actual voltage (0.7 volts) Ui of the mirror. In other words, a voltage of U1=0.7 volts is applied to the negative terminal 42 of the motor vehicle mirror 4. As a result, owing to the actual voltage of the motor vehicle mirror 4 of Ui=+0.7 volts, a voltage at the resistor Ri of the motor vehicle mirror 4 of 1.4 volts is obtained.

The internal capacitor Ci of the motor vehicle mirror 4 is then discharged using the discharge voltage of U1=0.7 volts. Since the target voltage is 0 volts, the charge state of the motor vehicle mirror 4 must be checked during the discharging in order to avoid a situation in which the actual voltage Ui of the capacitor Ci drops below zero volts.

In order to measure the actual voltage Ui, the charge process is interrupted and the motor vehicle mirror 4 is switched to high impedance, as already explained. If the microprocessor 2 detects that the actual voltage Ui has not yet reached the desired normal voltage of 0 volts, the discharge process is continued.

In the discharge process, the actual voltage Ui at the capacitor Ci of the motor vehicle mirror 4 will decrease so that the discharge voltage Ul at the negative terminal of the motor vehicle mirror 4 can be increased. In order to achieve a minimum discharge time, the discharge voltage Ul (t) at the negative terminal 42 of the motor vehicle mirror 4 should be selected or "simultaneously adapted" as a function of the respective actual voltage Ui(t) of the motor vehicle mirror 4 as follows:

$$Ul(t) = -Ui(t) + U\text{max},$$

Figure 3:
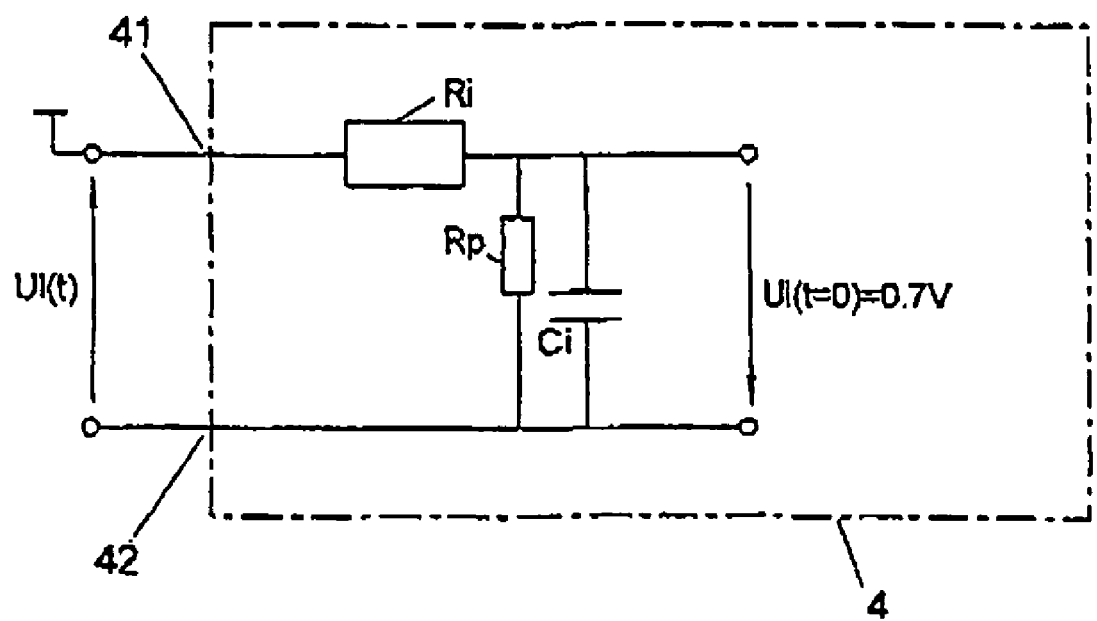
FIG. 3 is an electrical equivalent circuit diagram of a dimmable motor vehicle mirror during discharging.

Umax designating the maximum voltage at the motor vehicle mirror 4 of 1.4 volts (cf. FIG. 3).

The voltage Ul(t) thus increases in absolute terms from 0.7 volts at the start of the discharge process (t=0) to a final value of 1.4 volts when the discharge process is terminated.

As soon as the microprocessor 2 detects that the actual voltage Ui has reached the desired setpoint voltage Usoll=0 volts or lies in a predefined tolerance band, the discharge process is terminated and the voltage at the negative terminal of the motor vehicle mirror 4 is reduced to 0 volts. Then, the microprocessor switches to a control process in which the setpoint voltage of 0 volts at the connecting terminals of the motor vehicle mirror 4 is kept constant. The mirror 4 no longer has to be switched to high impedance in order to measure the actual voltage Ui in the following control process.

The control voltage of 0 volts for maintaining the normal state can be referred to as a "reference signal" for the normal state.

Figure 4:
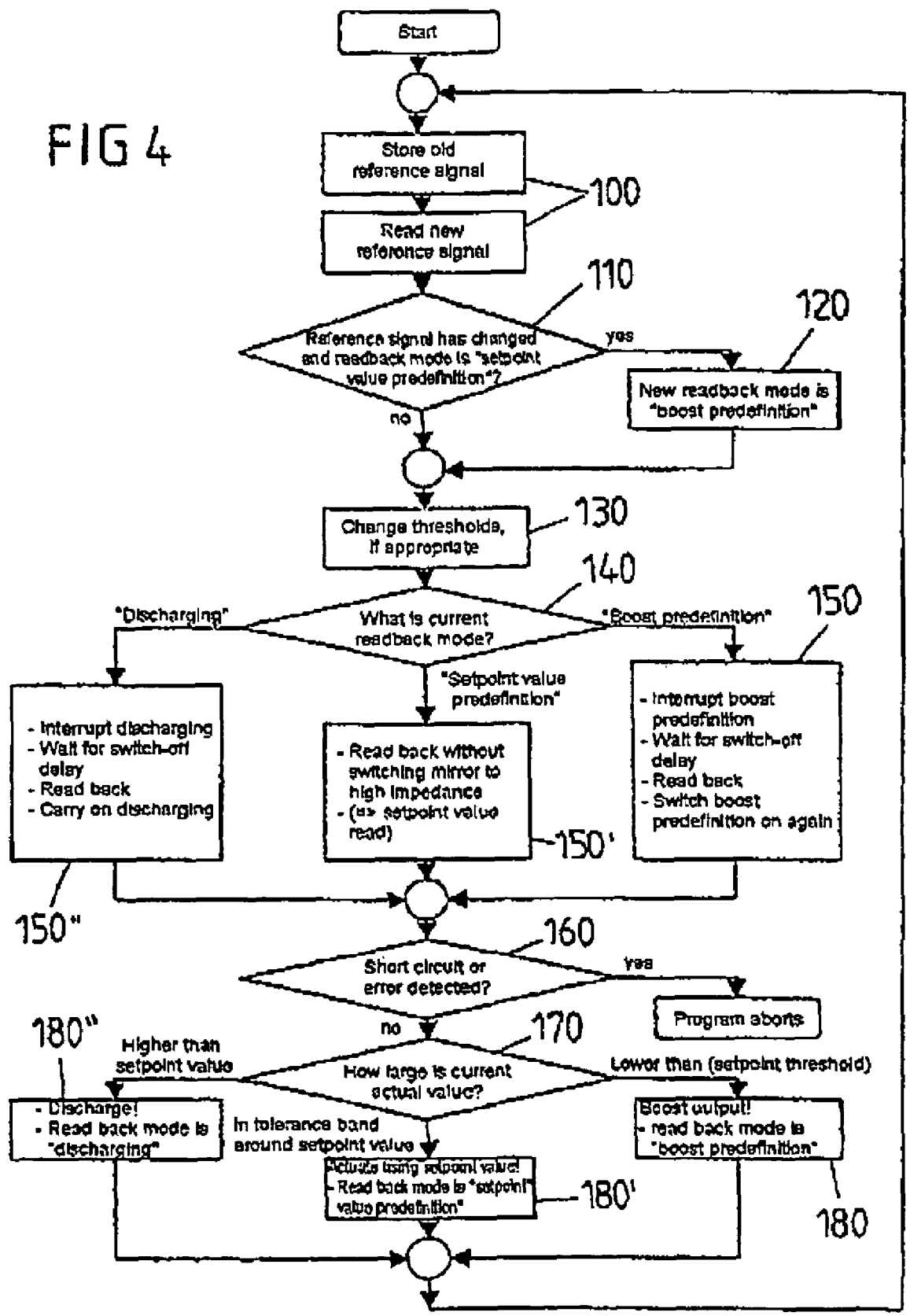
FIG. 4 is a flowchart which illustrates, by way of example, the method of operation of the control device according to FIG. 1 in detail.

FIG. 4 illustrates a flowchart, which shows by way of example the method of operation of the microprocessor 2 according to FIG. 1.

In the process step 100, the microprocessor 2 stores the "reference signal" last processed and determines the respective current reference signal by evaluating, for example, the information of the photodetectors. Alternatively, the reference signal can also be predefined from the outside to the microprocessor 2 by means of an interface connection. If the mirror 4 is to remain in its respective state—that is to say dimmed or not dimmed—the reference signal does not change. Otherwise the reference signal changes.

During the process step 110, the microprocessor 2 tests whether the reference signal has changed. Furthermore, the microprocessor 2 tests which "readback mode" it is in. The "setpoint value predefinition", "boost predefinition" and "discharge" for readback modes are distinguished. In the "boost predefinition" and "discharge" readback modes the motor vehicle mirror 4 is switched to high impedance before its charge state is measured. In the "setpoint predefinition" readback mode, the microprocessor 2 reads back, via the lines 37d and 57d, the voltage which is present at the two terminals of the motor vehicle mirror 4, without switching the mirror to high impedance; the actual charge state of the mirror is thus not measured but instead only the externally present control voltages of the two linear amplifiers 33 and 53 are measured. In the "setpoint value predefinition" readback mode it is assumed that the motor vehicle mirror 4 has reached its setpoint voltage so that, as it were, a charge current no longer flows and it is possible to dispense with switching the motor vehicle mirror 4 to high impedance. The "setpoint predefinition" readback mode is thus used exclusively if the motor vehicle mirror 4 has reached its respective "final operation state" and the actual voltage only has to be kept constant. In this phase, the operational amplifier 32 carries out the hardware control of the voltage at the motor vehicle mirror 4.

Below it is assumed by way of example that the motor vehicle mirror 4 is discharged and is adjusted to an actual voltage of 0 volts by the microprocessor 2. The readback mode is thus "setpoint value predefinition". The motor vehicle mirror 4 is then to be dimmed by being "charged" to a dimming voltage of 0.7 volts; for this purpose, the new reference signal is firstly set to 1.4 volts.

The microprocessor 2 then jumps to the process step 120 at which the readback mode is switched over to "boost predefinition". This means that the microprocessor 2 will in future read out the actual voltage Ui of the mirror with high impedance.

At the process step 130, a voltage of 1.4 volts is connected to the terminals of the motor vehicle mirror 4. Then, cf. process steps 140 and 150, the actual voltage at the motor vehicle mirror 4 is measured, or "read back", with high impedance.

If there is no short circuit present or some other fault is detected (process step 160), the microprocessor 2 jumps to the process step 170 and from there to the process step 180 at which the motor vehicle mirror 4 is charged and thus dimmed.

The loop composed of the process steps 100, 110, 130, 140, 150, 160, 170 and 180 is run through until the motor vehicle mirror 4 has reached its setpoint state or an actual voltage of 0.7 volts. The readback mode is then switched to "setpoint predefinition" and the voltage at the motor vehicle mirror 4 is adjusted to 0.7 volts (cf. in particular steps 150', 170 and 180').

A corresponding procedure is adopted for discharging. However, since the actual voltage Ui at the motor vehicle mirror 4 is higher than the setpoint voltage, the device is switched into the discharge branch 180" in which the motor vehicle mirror 4 is discharged. The readback mode is then correspondingly "discharging" (cf. in particular step 150").

Figure 5:
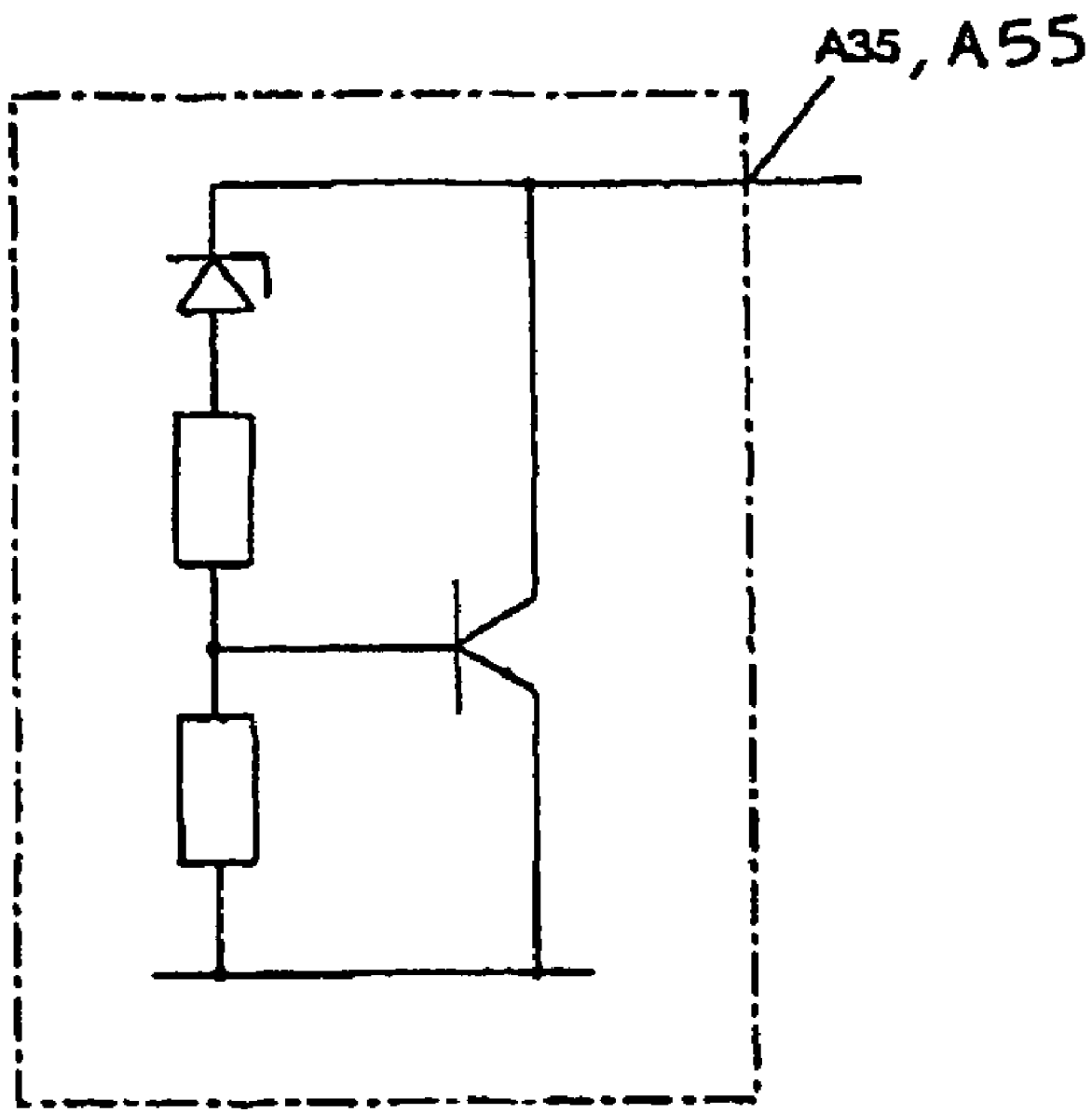
FIG. 5 shows an exemplary embodiment of a Vbat short-circuit protection device for the control device according to FIG.1.

FIG. 5 shows an exemplary embodiment of the Vbat short-circuit protection devices 35 and 55 according to FIG. 1. A Zener diode, which is connected by its one terminal to the terminal A35 (or A55) of the Vbat short-circuit protection device 35 (or 55) and thus to the motor vehicle mirror 4. With its other terminal, the Zener diode is connected to a voltage divider which is formed by two resistors and which is connected to a base terminal of an npn-transistor. The collector terminal of the npn-transistor is connected to the terminal A35 (or A55). The emitter terminal is connected to ground.

If the voltage potential at the terminal A35 or A55 rises above a threshold value which is predefined by the breakdown voltage of the Zener diode and the resistors, the npn-type transistor connects through so that the voltage at the mirror terminal is attracted to ground.

The invention claimed is:

1. A control device of an electrically dimmable motor vehicle mirror for setting a predefined degree of dimming of the mirror, wherein the control device at least one of charges and discharges the mirror to a setpoint voltage which is assigned to a predefined degree of dimming, and for setting the degree of dimming, a charge voltage is applied to the mirror which exceeds in absolute terms the setpoint voltage which is necessary for the predefined degree of dimming, and wherein the control device sets a predefined degree of dimming of the mirror by one of charging and discharging the mirror to the setpoint voltage, wherein the control device monitors a charge state of the mirror by electrically disconnecting the mirror from the charge voltage, and measures with high impedance an actual voltage which is present at the mirror.

2. The control device of claim 1, wherein the control device sets the predefinable degree of dimming of the mirror by one of charging and discharging the mirror to the setpoint voltage which is predefined for the respectively predefined degree of dimming, and wherein in order to increase the degree of dimming of the mirror, the control device applies to the mirror a charge voltage which exceeds in absolute terms the setpoint voltage which is necessary for the predefined degree of dimming, and wherein the control device applies the respective setpoint voltage to the mirror after the predefined degree of dimming has been reached.

3. The control device as claimed in one of claims 1 or 2, wherein the control device comprises a full bridge circuit.

4. The control device as claimed in claim 1, wherein the control device is connected to a sensor which measures light which is incident on the mirror, and the control device predefines the degree of dimming of the mirror at least as a function of the incident light power.

5. The control device as claimed in claim 1, wherein the control device is connected to at least one of an external mirror and to an internal mirror of a motor vehicle and actuates the at least one of an external mirror and internal mirror.

6. The control device as claimed in claim 1, wherein, in order to switch the mirror to a high impedance state, the control device further comprises at least one device selected from the group consisting of at least one switch and a linear amplifier.

7. A method for actuating an electrically dimmable motor vehicle mirror comprising:
   setting a predefined degree of dimming of the mirror by one of charging and discharging the mirror to a predefined setpoint voltage, wherein for the purpose of increasing the degree of dimming, a charge voltage which exceeds in absolute terms the setpoint voltage necessary for the predefined degree of dimming is applied to the mirror, and wherein the setpoint voltage is applied to the mirror after the predefined degree of dimming has been attained,
   wherein in order to discharge the mirror, the polarity of the charge voltage is reversed, and wherein a voltage which corresponds in absolute terms to the difference in voltage between a maximum permitted voltage of the mirror and a respective actual voltage of the mirror is applied to the mirror.

8. The method as claimed in claim 7, wherein the respective maximum permitted charge voltage for the mirror is applied during the increasing of the degree of dimming.

9. The method as claimed in one of claims 7 or 8, wherein, during the charging of the mirror, a charge voltage which corresponds to the maximum permitted voltage for the mirror is applied to the mirror.

10. The method as claimed in claim 9, wherein the charge voltage is switched over from the maximum voltage to the setpoint voltage as soon as the actual voltage of the mirror at least one of corresponds to the setpoint voltage and lies within a tolerance band which is predefined for the setpoint voltage.

11. The method as claimed in claim 7, wherein, during the discharging of the mirror, the charge voltage is simultaneously adapted so that the voltage which is present at the mirror during discharge, corresponds in absolute terms to the difference in voltage between the maximum permitted voltage of the mirror and the actual voltage of the mirror.

12. The method as claimed in claim 7, wherein at least light which is incident on the mirror is measured and the degree of dimming of the mirror is predefined at least as a function of the incident light power.

13. The method as claimed in claim 7, wherein, during the discharging of the mirror, the charge voltage is simultaneously adapted so that the voltage which is present at the mirror during the entire discharge process corresponds in absolute terms to the difference in voltage between the maximum permitted voltage of the mirror and the actual voltage of the mirror.

14. A method for actuating an electrically dimmable motor vehicle mirror comprising:
   setting a predefined degree of dimming of the mirror by the mirror being one of charged and discharged to a predefined setpoint voltage, wherein, for the purpose of increasing the degree of dimming, a charge voltage which exceeds in absolute terms the setpoint voltage necessary for the predefined degree of dimming is applied to the mirror, and wherein the setpoint voltage is applied to the mirror after the predefined degree of dimming has been attained,
   wherein the predefined degree of dimming of the mirror is set by the mirror being one of charged and discharged to a predefined setpoint voltage, wherein a charge state of the mirror being monitored at least during one of the charging and discharging of the mirror by being electrically disconnected from the charge voltage and an actual voltage which is present at the mirror is measured with high impedance.

15. The method as claimed in claim 14, wherein the electrical charge state of the mirror is monitored at least one of cyclically and continuously.

16. The method as claimed in one of claims 14 to 15, wherein the charge state of the mirror is also monitored by sensing at least one of the charge current and discharge current flowing through the mirror and evaluating the at least one charge current and discharge current.

17. The method as claimed in claim 16, wherein the at least one charge current and discharge current flowing through the mirror is integrated, and wherein the resulting integration result is used to determine the charge.

* * * * *